United States Patent [19]

Wallace

[11] Patent Number: 4,473,289

[45] Date of Patent: Sep. 25, 1984

[54] INCIDENT LIGHT FILTER FOR CAMERAS

[76] Inventor: George A. Wallace, 13695 Uvas Rd., Morgan Hill, Calif. 95037

[21] Appl. No.: 478,534

[22] Filed: Mar. 24, 1983

[51] Int. Cl.³ .......................... G03B 11/00; G02B 5/22
[52] U.S. Cl. ..................................... 354/476; 354/295; 350/314
[58] Field of Search .............................. 354/476–483, 354/295, 296; 356/221, 225, 234; 350/314, 318, 321

[56] References Cited

U.S. PATENT DOCUMENTS

| | | | |
|---|---|---|---|
| 2,612,817 | 10/1952 | Willcox | 356/221 |
| 4,381,890 | 5/1983 | Wallace | 354/476 |
| 4,391,521 | 7/1983 | Imai et al. | 354/481 X |

Primary Examiner—William B. Perkey
Attorney, Agent, or Firm—John J. Leavitt

[57] ABSTRACT

Presented in several different aspects is an incident light filter or cap assembly adapted to be attached over the lens of a camera for the purpose of permitting adjustment of the camera controls in view of the incident light conditions that exist at the time the picture is taken.

4 Claims, 6 Drawing Figures

INCIDENT LIGHT FILTER FOR CAMERAS

BACKGROUND OF THE INVENTION

1. Field of the Invention

This invention relates to filter devices, and more particularly to a filter device for use in conjunction with single-lens reflex cameras with through-the-lens light metering facilities, to enable use of these meters as incident light meters in a method so convenient and accurate as to assure it the popular acceptance which other incident-light methods have been denied.

2. Description of Prior Art

It is believed that prior art related to the subject matter of this invention is classified in class 350, sub-classes 255 and 266; and class 256, sub-classes 213, 221 and 234. A search of these classes and sub-classes has revealed the existence of U.S. patents as follows: U.S. Pat. Nos. 2,803,162; 2,824,696; 2,879,690; 2,930,281; 2,972,930; 2,983,186 and 3,112,684. Reference is also made to allowed pending application Ser. No. 151,391 filed May 19, 1980, now U.S. Pat. No. 4,381,890, by the inventor herein, and the patents cited therein.

The above listed patents, with the exception of U.S. Pat. No. 3,112,684, relate to light meters equipped with translucent domes which work in conjunctuon with the light measuring circuits incorporated in the light meter, and thus permit a photographer to take readings or determinations from the light meter that can then be transferred as appropriate settings to a camera. The exception, U.S. Pat. No. 3,112,684, discloses the broad concept of a translucent dome in conjunction with a camera in a permanent relationship that complicates the use of the camera in a conventional manner without the use of the translucent dome. To develop a better understanding of the problems involved with focusing single-lens reflex cameras equipped with through-the-lens metering facilities, it should be understood that there are two basic methods of employing light meters to aid in the determination of camera exposure settings for optimum exposure of a subject being photographed.

THE REFLECTANCE METHOD

The reflectance method of determining exposure settings is common to all single-lens reflex cameras with through-the-lens metering facilities. This method permits optimum exposure settings to be made only for those subjects whose weighted average reflectance values conform to the eighteen percent (18%) reflectance characteristics which camera manufacturers, almost without exception, have arbitrarily established as "average" reflectance. It is not generally known by the vast majority of people using single-lens reflex cameras with through-the-lens metering facilities that the light metering circuits in the camera are "calibrated" to respond to this 18% reflectance characteristic.

To understand how this situation has come about, and why the vast majority of amateur photographers take only "average" photographs because of the "average" conditions or characteristics built into their cameras, it is important to understand the historical development of single-lens reflex cameras having through-the-lens metering facilities.

The Weston Exposure Meter, believed to be the first commercially available hand-held light meter, appeared on the market in 1932 and was capable of indicating for the photographer exposure settings based upon either illumination levels or upon surface brightness values. The "illumination level" approach, known as the "incident light method", was quickly adopted for motion picture work as the best method for maintaining constant image tones for key subject values such as skin tone, despite changes in either illumination level or average brightness of the scene as a whole. By this method, once the aperture setting for use with any given film and illumination level was determined, variations in aperture as indicated by the meter compensate for any changes in illumination level, and all image tones or negative densities related to specific key subject values remained unchanged. No further evaluations or judgements regarding the amount of exposure had to be made by the photographer regardless of whether the scenes themselves are predominantly light, dark, or in between.

With the advent of Weston Exposure Meter, a second method for indicating exposure settings was introduced. This second method, known as the "Reflectance Method", quickly dominated the still photography field. Here, the meters were initially used by professional and advanced amateur photographers working with view cameras and painstaking exposure procedures. Multiple readings of key brightness values were taken of a given scene, including those of the brightest and darkest areas of interest in the subject or scene. These readings were then employed to aid the photographer to previsualize the print as it might appear as a consequence of established variations in film exposure and development, and in determining the optimum exposure and development times for the production of that negative best suited for the rendering of the final print. By this method, in contrast with the "incident light method" described in the preceeding paragraph, the photographer was required to thoroughly study his key subject values in each situation, and previsualize then in image tones, before making the exposure. It is understandable therefore why this method was initially restricted to use by professional and advanced amateur photographers.

With the advent of hand-held cameras, photographers initially employed both the "incident light method" and the "reflectance method" for determining exposure values. However, with the great proliferation of hand-held cameras, the vast majority of hand-held camera photographers followed the "reflectance method" and within a decade, hend-held cameras with built-in reflectance type meters were on the market. Today, there are many millions of such cameras, many of them being fast 35 millimeter single-lens reflex cameras equipped with a multitude of complicated electrical, electronic and mechanical devices.

Because of the tremendous numbers of such cameras manufactured and sold, it has become necessary, for mass production purposes, to incorporate in such cameras exposure setting mechanisms designed to respond in the same way to a given brightness of the scene or subject. Adding to the necessity for such "average" exposure characteristics is the fact that millions of rolls of film are sold for use in such cameras and therefore, standard, mass production type film processing procedures have had to be designed to process these millions of rolls of exposed film in a reasonable length of time. To justify such standard film processing procedures it is obvious that the vast majority of film being processed is not "custom" processed. Rather, it is subjected to the mechanical film processing procedures dictated by mass production expediency.

Thus, to satisfy the needs of the masses of people that utilize these cameras and expose these rolls of film, the vast majority of hand-held camera photographers are restricted in the quality of the end product because the exposure readings provided by the camera light meter are "calibrated" to an "average" 18% reflectivity characteristic from the subject, followed by processing of such "average" exposure to a processing procedure that is also "standard" or "average" for the particular type of film being processed. Thus, the buying public has been forced to accept the same constant average density or positive direct image tone in the end product regardless of whether the subject itself is light, dark, or in between. It is thus apparent that while the "reflectance method" may be used to advantage in the still photography field by professional and advanced amateur photographers, the application of the reflectance method to hand-held cameras has heretofore resulted in great loss in the quality of the end product because of the reasons which follow:

Given a subject in uniform lighting, with an average reflectance value of approximately 18%, all values in that subject will appear rendered with optimum tonal placement. This value corresponds with that of a middle-gray card, reflecting five times and one-fifth as much light, respectively, as an arbitrarily chosen black and white. State another way, given these conditions, the average reflectance of 18% from a middle-gray card is five times the reflectance from a black card and only one fifth the reflectance from a white card. The constant image tone most camera meters are programmed to render is midway in the range of the transparencies' readable tones, representing values from black to white. In this instance, the subject's average value corresponds with the average value that camera and film are programmed to render, and with the type of film used in producing the transparencies, the margin of error is plus 40% to minus 30%.

Given a subject in the same lighting, but with an average reflectance value substantially less than 18%, it will be rendered in the same image tones as in the case described above, with all values in the subject appearing to have been rendered too dark, and the film appearing to have been over exposed.

Given a subject in the same lighting, but with an average reflectance value substantially *greater* than 18%, all values will appear too light in the image, and the film will appear to have been underexposed.

Given a strongly side-lit or back-lit subject, as seen from the camera position, the strongly-lit areas may make the *average* brightness value high, compared with the brightness of those areas in lesser illumination. Then, with the average brightness rendered in the constant average image tones, these other areas appear too dark, and the film, under exposed.

Conversally, the presence of large dark areas behind strongly front-lit subjects could significantly lower the average brightness level of the scene, so that when rendered in the normal constant image tone, the scene appears too light, images of all objects in the scene appear too light, and the film appears overexposed.

From the above it can be seen that if cameras having built-in light meters are intended to automatically indicate or provide the aperture and shutter speed setting for correct exposures, then the results indicated above are evidence of the camera's limitations, rather than of the photographer's lack of ability. While it is true that the meter can be overridden, intimation from publications and data sheets published with respect to the effectiveness of such meters is that it then becomes the photographer's responsibility if inadequate results are achieved, and therefore, the tendency is to follow the meter slavishly. Most photographers, with no capability for evaluating a scene in the meters "averaging" or "weighted average" fashion, have no way of knowing the discrepency between the meter's evaluation and the actual average brightness level required for optimum exposure. Thus, the photographer cannot know how much adjustment to provide even if he realizes that the meter can be overridden. Knowing how much of an adjustment to make is important because with direct color positive transparency films, the maximum permissible margin for error in exposure, consistent with acceptable results, is approximately minus 30% to plus 30%. Subject brightness ratios are often as high as 1:250.

In working with color negatives or black-and-white negatives, the effect of many exposure errors are nullified or concealed by the printing procedure of the final print. However, image details lost through underexposure and image sharpness lost through camera movement while the shutter remained open overly long in overexposures, cannot be restored. Accordingly, it is seen that the overall loss that is suffered by the field of photography is the loss of considerable capability in all fields of photography amenable to hand-held camera treatment, and the inability to know and exploit the full potential of these cameras and films beyond the narrow field of operations within which these cameras are presently programmed to function on their own.

One method of making these hand-held cameras more effective would be to place a plain card of any value facing the camera and in the same illumination as a subject to be photographed, and filling the cameras field of view, to serve as a "standard" value in place of the camera and meter's natural variable value, in establishing exposure settings for a given scene or subject. If such a card were of optimum value for rendering of all values in the same illumination, then it would serve to provide optimum exposure settings for the rendering of all values in any illumination. However, such a card is a cumbersome thing to carry and protect, and often reflects excessive light due to surface glare and, in working with people, it is disruptive and awkward to use in that it is almost impossible to withdraw the subject's attention from the card so as to enable taking an adequate photograph.

Accordingly, it is one of the objects of the present invention to provide a device that is easily attachable to the camera in an unobtrusive manner, which effectively passes substantially the same amount of light to the camera light meter as an optimum gray card reflects so as to permit direct adjustment of the camera aperture and shutter speed settings correctly for the given scene or subject, and which may then be removed from the camera during the picture-taking operation.

This invention thus proposes the use of a light diffusion disc or filter capable of passing a specific portion of the illumination falling upon it to the optical system of any single-lens reflex camera equipped with through-the-lens metering facilities, to simulate the average brightness value (of the subject) required for the optimum rendering of an arbitrary gray scale with reflectance values ranging from white (96%) to black (3%), in that illumination. In accomplishing this purpose, it provides in every instance, a simulated optimum subject brightness value for any given illumination level, and a simulated constant reflectance value regardless of that level of illumination. With this type data transmitted to the light meter embodied in the camera, the aperture and shutter speed may be set accurately while the diffusion device is in place on the camera and is subsequently removed when it is desired to photograph the scene or subject.

A similar function is performed by separate incident light meters, but not in as direct a manner. Thus, with an incident light meter, most of which are expensive, fragile and loseable, the light that is "read" by the meter travels a different path than that forming the image itself. Additionally, such separate incident light meters are cumbersome in that they must be gotten out of whatever resceptacle they are carried in, they must be uncovered and put into use, and once in use, a two stage procedure is required for operation, with attendant further losses in time, mood and rapport with the subject. With such incident light meters, it is necessary to adjust at least one ring or dial, locate and read off aperture numbers and shutter speeds, and transform those into exposure settings on the camera itself, with attendant cumulative small errors adding up as the procedure progresses. Accordingly, it is another object of this invention to eliminate such complexities and chances for error by providing a diffusion cap or filter that is easily attachable to and detachable from the camera so that all that is required is to point the camera with the diffusion device attached away from the subject and toward the source of light, adjust the aperture and shutter speed of the camera, turn back to the subject, remove the diffusion device, focus on the subject and actuate the shutter release.

More specifically, another object of this invention is to provide a diffusion device easily attachable and detachable in front of the lens of a camera and fabricated from a flat translucent disc of plastic, glass or other suitable material, one surface of which is formed with a multiplicity of prismatic projections adapted to admit side lighting from the subject being photographed in a manner not heretofore possible.

A still further object of the invention is the provision of a diffusion device for application to a camera that permits adjusting the aperture and shutter speed settings of the camera lens without the necessity of reading any dials or scales or making any computations to achieve proper aperture and shutter speed settings.

Another object of the invention is the provision of such a diffusion device that is economical to manufacture, has wide applicability to many different cameras, and which is easy to use for even inexperienced photographers.

Still another object is the provision of a diffusion device for application to the lens of a camera for determining the proper exposure settings of the lens, and which admits light to the light meter of the camera in such a manner that correct readings of the light meter are obtained even though much of rhe light reflected from the subject is side light, and which device is flat in its configuration so as to facilitate storage and use.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the diffusion device of the invention comprises a generally flat circular assembly including a flat transluscent diffusion disc that receives light from a lens plate having a flat surface facing the source of light falling on the subject to be photographed, and having a prismatic surface facing the flat diffusion disc. A filter member is disposed between the flat diffusion disc and the lens plate to control the quality of light passing through the assembly. A circular mounting ring is provided to retain the parts in a composite assembly and to mount the assembly on the lens of a camera.

DESCRIPTION OF THE PREFERRED EMBODIMENT

Figure 6:
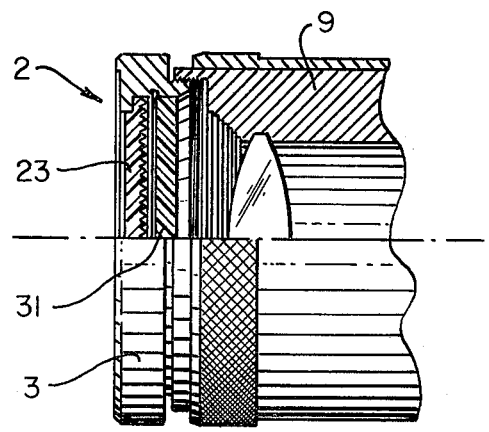
FIG. 6 is a fragmentary view, partly in section and partly in elevation showing the application of the diffusion device of the invention to the lens of a camera.
Figure 5:
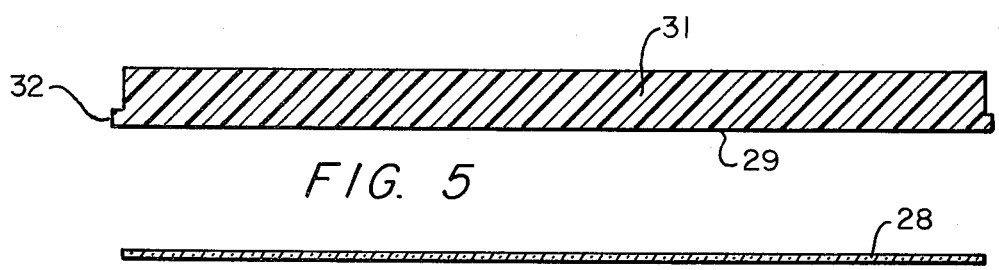
FIG. 5 is a cross-sectional view through the center of the diffusion disc which receives light from the lens plate.
Figure 4:
FIG. 4 is a cross-sectional view through the center of the filter disc or member, shown apart from the rest of the structure.
Figure 3:
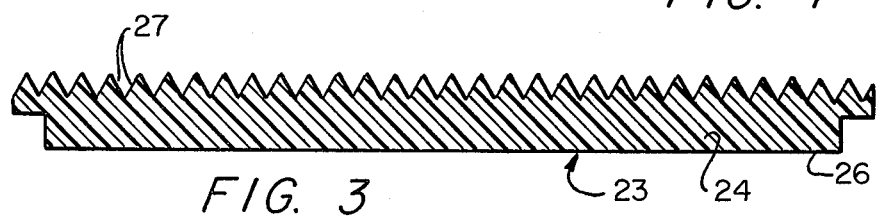
FIG. 3 is a cross-sectional view through the lens plate of the assembly, shown apart from the rest of the structure.
Figure 2:
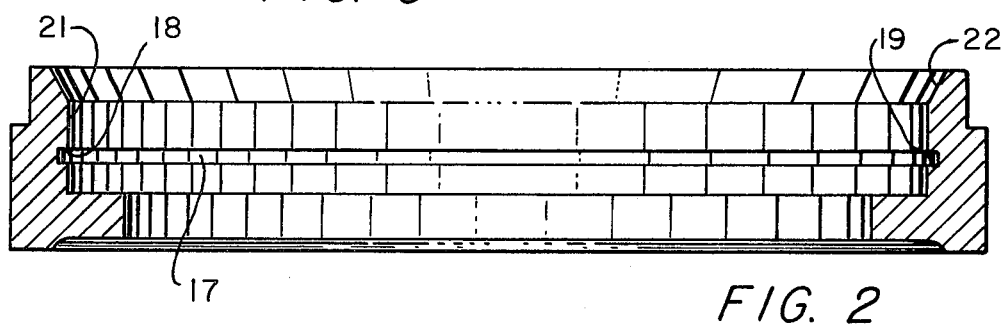
FIG. 2 is a cross-sectional view through the mounting ring which holds the other components together in a composite assembly, and which serves to mount the assembly on the lens of the camera.

It is clear from the discussion above that neither the "reflectance" method nor the "incident light" method are ideally suited for use with the single-lens reflex camera equipped with through-the-lens metering facilities. In conjunction with the "reflectance" method it is obvious that the use of a gray card with a hand-held single-lens reflex camera equipped with through-the-lens metering facilities is too cumbersome and inconvenient to be used by the great majority of photographers. Use of such a gray card for determining the proper setting of the camera in anything but a studio environment has proved awkward, inconvenient and, despite knowledge of this method, has never gained favor with hand-held camera photographers.

In like manner, the "incident light" method has the disadvantage that it requires the use of a second and independent light metering facility in the form of a fragile hand-held meter pointed directly toward the source of illumination with exposure settings being indicated by the meter in accord with the strength of that illumination and the sensitivity of film to which the meter is attenuated. There is of course no question that this is an excellent method for accurately evaluating exposure conditions and determining exposure settings. However, the "incident light" method utilizing a separate hand-held meter does require the additional adjusting and reading of meter dials, and a manual translation of those readings into actual exposure control settings on the camera itself. These additional steps introduce a margin of error and a level of inconvenience and additional cost that has worked to prevent the wide acceptance of the "incident light" method by photographers.

I have found that the light diffusion device forming the subject matter of this invention is inexpensive, easy to apply, and provides a more accurate basis for the setting of camera controls then the methods described above. To that end, in terms of greater detail, and as illustrated in the drawings, I have provided a translucent filter or cap adapted to be mounted on a camera lens assembly, or on a lens hood, and which functions to transmit or pass to the built-in camera light meter approximately 18% of the light impinging upon the filter. The filter may be prismatic in addition to being translucent so as to diffuse the light impinging thereon. The translucent filter or diffuser passes approximately 18% of the light falling upon it to activate the built-in light meter whereas the gray card discussed above depends upon its "reflectance" characteristics which commonly do not approximate 18% of the light falling upon the subject for many reasons. It will thus be seen that the translucent filter or diffuser provided by this invention is far simpler, faster, more convenient, and practical and durable in use, and provides a better and more accurate measure of the light falling upon the scene or subject. Additionally, the translucent filter or diffuser avoids the gray card problem of surface glare, a factor often resulting in erroneous readings.

In another aspect, the translucent filter or diffuser forming the subject matter of this invention may be considered as a means for establishing optimum aperture and shutter speed settings directly from illumination levels, rather than from reflectance brightness values, as is customary in hand camera use. In this respect, the incident light translucent filter or diffuser is designed to work in conjunction with any camera through-the-lens light meter to cooperate directly with the camera in a way similar to the way in which separate hand-held incident light meters function, but eliminating the intermediate steps of observing readings on the separate hand-held meter and transferring such readings to appropriate dials and settings on the camera itself.

Additionally, it should be noted that separate apart from the camera hand-held incident light meters that employ translucent discs or domes are especially designed to function with light sensitive cells and amplifiers specifically attenuated to produce the desired results when used in the manner prescribed. By contrast, the incident light translucent filter or diffuser of this invention functions with any single-lens reflex camera equipped with through-the-lens metering facilities, and is independent of any specially attenuated light cells and amplifiers.

To emphasize the simplicity and the accuracy with which a camera can be adjusted which is equipped with the incident light translucent filter or diffuser of this invention, as compared with adjustments achieved through use of a separate hand-held light meter, it is noted that these separate hand-held light meters are capable only of indicating optional pairs of aperture and shutter speed settings. Options must be read and considered, one pair of settings chosen, and the aperture ring and shutter speed knob of the camera adjusted to translate and incorporate in the camera the readings derived by the separate hand-held light meter. This complicated procedure is in contrast to the use of the incident light translucent filter or diffuser of this invention which works in conjunction with the camera's built-in light meter to almost instantly provide appropriate settings.

Figure 1:
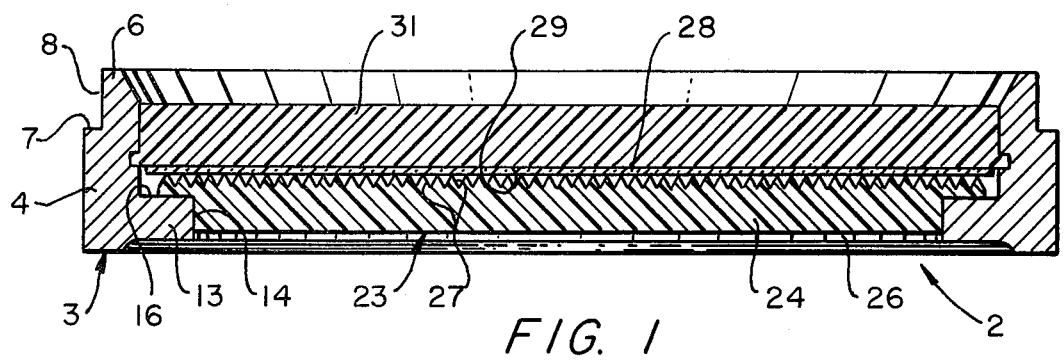
FIG. 1 is a cross-sectional view through the center of the circular diffusion device of the invention.

Structurally, the incident light filter of the invention is shown in cross-section in FIGS. 1–5 because the assembly is symmetrical and it is believed this showing will adequately instruct the manner of construction of the filter device. Referring to FIG. 1, there is illustrated the filter assembly designated generally by the numeral 2, and comprising a mounting ring 3, having a body portion 4, annular in configuration and terminating in a cylindrical flange 6 having a shoulder 7 formed thereon next adjacent a cylindrical mounting surface 8 the outer peripheral dimension of which is accurately sized to press onto the threaded barrel 9 of a lens assembly 12, as shown in FIG. 6. The mounting ring 3 is preferably fabricated from unchained polyoxy-methylene, the nature of the material being such that it may be pushed onto the threads formed in the barrel 9 without injury to either the ring or the threads, but with sufficient frictional engagement to securely retain the mounting ring on the lens.

The mounting ring also provides a radially inwardly extending flange 13 having an inner periphery 14, and an inner flat annular surface 16 for purposes which will be hereinafter described. Additionally, the mounting ring is formed on its inner periphery with a circumferentially extending groove 17 having top and bottom sides 18 and 19, respectively, the top side 18 forming a shoulder next adjacent the inner peripheral surface 21 of the mounting ring. This inner peripheral surface is cylindrical in configuration as shown, and merges smoothly with a tapered or conically formed outwardly diverging surface 22.

Seated on the mounting ring, specifically seated on the annular surface 16, is a clear plastic, i.e., transparent, disc 23, having a transparent body 24, a flat outer surface 26 and an inner surface formed from a multiplicity of prismatic projections 27. Disposed within the mounting ring next adjacent the prismatic surface of the lens plate 23 is a flat translucent member 28, appropriately dyed to control the color of light passing therethrough to the near side 29 of the diffussion disc 31. This diffusion disc is translucent, and the face thereof next adjacent the prismatic projections 27 receives light from the prismatic projections, diffuses that light, and presents it to the light meter cells contained within the camera so as to enable proper adjustment of the camera exposure controls.

Dimensionally, the lens plate 23 is rabbetted on its peripheral edge as shown so that it drops snugly into the opening formed by the flange 13 of the mounting ring. The transluscent filter member 28 is then dropped into the ring and it coms to rest on top of the prismatic projections as shown. Next, the transluscent disc 31, which is formed with a radially outwardly extending circular flange 32, is dropped onto the ring so that it comes in contact with the outwardly diverging conical surface 22. Pressure is applied to the flat transluscent diffusion disc, causing the outer periphery thereof to cam the flange 6 outwsrdly sufficiently so that the flange 32 passes down through the cylindrical surface 21, and then snaps into the recess formed by the groove 17.

It has been discovered that by placing the lens plate 23 in front of the diffusion disc 31, light passing through the lens plate impinges on the inner surface of the diffusion plate and then passes through the diffusion plate or disc to the lens and light meter of the camera. It has been found that the prismatic disc 23 has the effect of transmitting to the diffusion disc a greater percentage of the light from off-axis directions in the vicinity of the normal axis than from directly in front of the lens, with the transmission factor increasing as the angle between the normal to the disc and the direction of the light from the light source increases.

Thus, as the light source swings farther and farther off-axis, less light is intercepted by the face of the lens plate, but a greater percentage of the light that is intercepted is transmitted on to the translucent disc 31 and through it to the light-sensitive cells in the exposure meter in the camera. In thus functioning to reduce the "fall-off" in the intensity of light transmitted to the meter, as light sources move off-axis, the lens plate 23 in front of the translucent disc 31 permits the combination to function very much like the translucent hemispherical shell structures described and claimed in this inventor's application Ser. No. 151,391 noted above, but without the disadvantage of projecting in front of the camera quite so far as to be unwieldy.

Having thus described the invention, what is thought to be new and novel and sought to be protected by Letters Patent of the United States is as follows:

I claim:

1. In combination with a single-lens reflex camera having a through-the-lens built-in light metering facility including light-sensitive cells and a lens assembly for admitting light to activate said light metering facility and for focussing an image of a photographic subject on film within the camera, a translucent image-blocking device detachably secured in front of said lens assembly whereby approximately 18% of the light from a source thereof impinging on said translucent image-blocking device passes therethrough and through said lens assembly to activate the light sensitive cells in said built-in light metering facility whereby adjustments of the exposure controls of the camera may be set after which said translucent image-blocking device is removed to permit the image of the photographic subject to pass through the lens assembly when the subject is photographed, a lens plate juxtaposed to said transluscent image-blocking device and including a flat surface facing the source of light and a light transmitting prismatic surface next adjacent the trnasluscent device and adapted to transmit light thereto, a filter member formed from thin transluscent sheet material interposed between the transluscent device and the lens plate, and a mounting ring surrounding said transluscent device, said lens plate and said filter member and retaining said components in a composite assembly for attachment to the lens of the camera.

2. The combination according to claim 1, in which said lens assembly is provided with internal threads on its inner periphery, and said mounting ring includes a cylindrical flange having a smooth exterior surface adapted to frictionally engage the internal threads on said lens assembly.

3. An incident light filter for cameras of the single-reflex type equipped with through-the-lens light meter facilities, comprising:

a. a mounting ring adapted to frictionally engage the lens asssembly to enable detachable securement to the lens assembly;

b. a lens plate including a flat surface and a prismatic surface mounted in the mounting ring;

c. a filter member mounted in the mounting ring next adjacent the prismatic surface of the lens plate; and d. a flat transluscent image-blocking diffusion disc mounted in the mounting ring on the side of said filter member opposite the lens plate.

4. The combination according to claim 3, in which said lens plate, said filter member and said diffusion disc are circular in configuration.

* * * * *